Feb. 17, 1942.                C. AMBRUSTER                2,273,244
                           STORAGE BATTERY CELL
                           Filed April 3, 1940
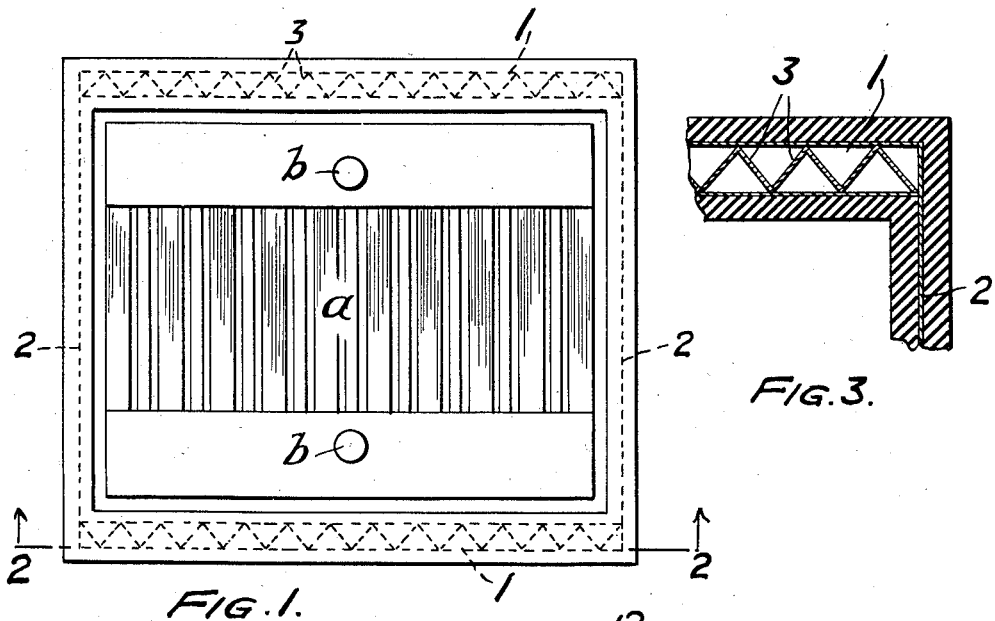
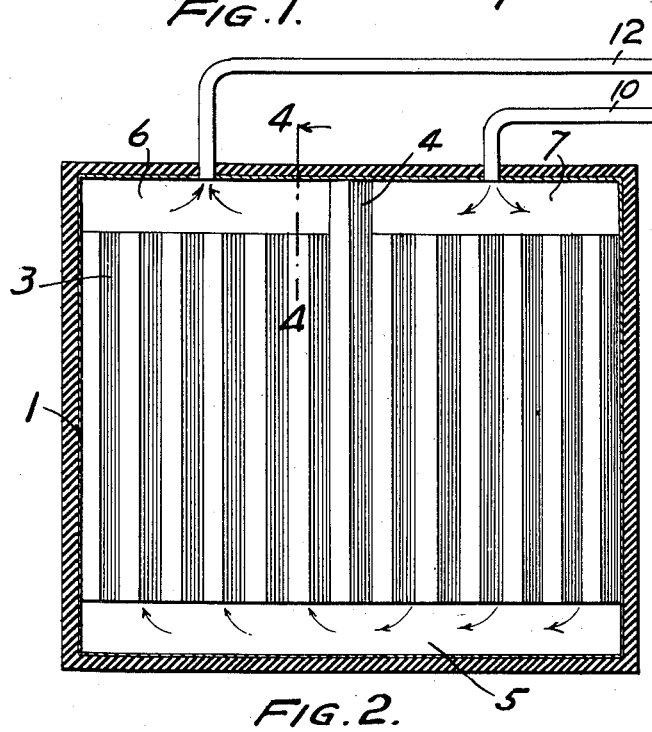
INVENTOR
Cornelius Ambruster
BY
Augustus B. Stoughton
ATTORNEY.
WITNESS:

Patented Feb. 17, 1942

2,273,244

UNITED STATES PATENT OFFICE 2,273,244

STORAGE BATTERY CELL

Cornelius Ambruster, Roslyn, Pa., assignor to The Electric Storage Battery Company, Philadelphia, Pa., a corporation of New Jersey Application April 3, 1940, Serial No. 327,557

6 Claims. (Cl. 136—166)

The principal object of the present invention is to provide a comparatively inexpensive, efficient and reliable structure which, when embedded in the walls of rubber or similar material of the cell, serves not only to impart mechanical strength to the cell but also as a means by which the cell can be efficiently and satisfactorily cooled or heated.

Other objects of the invention will appear from the following description at the end of which the invention will be claimed.

Generally stated, the invention comprises a metal box structure embedded in one or more of the cell walls, for example in each of two opposite walls, with a plain metal plate embedded in each of the other cell walls, the box structures and the plates, if used, being interconnected at at corners of the cell, and partitions arranged in each box structure, preferably by means of a corrugated metal sheet secured to the inner faces of the walls thereof, imparting strength and rigidity and providing channels through which a heat transferring fluid is circulated.

The invention also comprises the improvements to be presently described and finally claimed.

In the following description reference will be made to the accompanying drawing forming part hereof and in which:

Figure 1 is a top plan view of a storage battery cell embodying features of the invention and showing the cover removed;

Figure 2 is a vertical section taken on the line 2—2 of Fig. 1;

Figure 3 is a horizontal sectional view drawn to an enlarged scale and showing details of construction, and Figure 4 is a vertical section drawn to an enlarged scale and taken on the line 4—4 of Figure 2.

Referring to the drawing, 1 indicates metal box structures embedded in each of a pair of oppositely disposed cell walls which are of rubber or similar material. 2 indicates metal plates embedded in each of the other pair of oppositely disposed cell walls. The plates 2 are interconnected with the box structures at the corners of the cell. As shown, the plates 2 consitute the end walls of the box structure. 3 indicates a corrugated partition arranged in each box structure and the partition terminates short of the top and bottom of the box structure with the exception that one of the ribs or corrugations 4 extends upward to the top of the box. Thus there is provided a chamber 5 at the bottom of the box structure and two chambers 6 and 7 at the top of the box structure. The high parts of the corrugated partition are attached or secured to the walls of the box structure at the line of contact, thus providing a series of vertical channels. 8 indicates a cooling coil and 9 indicates a pump by means of which cooling fluid, such as water, or any other fluid heat transfer medium, enters the chamber 7 through the pipe 10 and is circulated downward through the channels to the chamber 5 at the bottom of the box, thence through the channels to the chamber 6, and thence by the pipe connection 12 back through the coil. The plate structure is indicated at $a$ and its terminals at $b$.

There is thus provided a strength-imparting structure embedded in, and insulated by, the material of the walls of the cell, and there is also afforded in a simple and satisfactory manner means for circulating cooling fluid and thus controlling the temperature of the cell. Furthermore, these cooling means are electrically insulated since they are embedded in the rubber or rubber material walls of the cell.

The usual cover for the cell may be employed but, for sake of clearness, it is not illustrated.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. A reinforcement for strengthening and cooling storage battery cells which comprises the combination of a generally rectangular cell having side walls of rubber material, metal box structures embedded in and confined to each of a pair of oppositely disposed cell side walls, metal plates embedded in and confined to each of the other pair of oppositely disposed cell side walls, said plates and box structures being interconnected at the corners of the cell, a corrugated partition arranged in each box structure and secured to the opposite walls thereof imparting strength and providing vertically disposed channels and terminating short of the top and bottom thereof providing chambers at the top and bottom of the box, a corrugation of the partition extending upward and sub-dividing the top chamber, and means for introducing cooling fluid into one division of the top chamber and withdrawing it from the other division of the top chamber.

2. A reinforcement for strengthening and temperature controlling storage battery cells which comprises the combination of a generally rectangular cell having walls of rubber material, metal box structures embedded in and confined to each of a pair of oppositely disposed cell side walls, metal plates embedded in and confined to each of the other pair of oppositely disposed cell side walls, said plates and box structures being interconnected at the corners of the cell, a corrugated partition arranged in each box structure and secured to the opposite walls thereof imparting strength and providing vertically disposed channels and terminating short of the top and bottom thereof providing chambers at the top and bottom of the box, and means for circulating a temperature controlling fluid through the channels provided by the corrugated partitions.

3. In a generally rectangular storage battery container having walls of rubber material, a reinforcing structure for strengthening and providing internal circulation space in the side walls of said container comprising, a metal box structure embedded in and confined to a side wall of said container and divided by a partition comprising angularly disposed members attached to opposite sides of said box structure so as to impart strength and rigidity to said box structure and therefore to said side wall, said partition also arranged to provide channels for the circulation of fluid, and means for circulating said fluid thru said channels.

4. The combination with the side wall of a generally retangular storage battery container made of plastic acid resisting material, of a generally rectangular metal box structure embedded in and confined to the interior of the side wall of the container, and angularly disposed partition means for dividing the interior of the box and attached to the confronting walls of the box and providing with the side walls of the box a truss-like structure imparting strength and rigidity to the box and thus to the side walls, said partition means arranged to provide channels adapted for the circulation of fluid.

5. The combination substantially as described in claim 4 and in which said partitions terminate short of the top and bottom of the box providing chambers at the top and bottom of the box.

6. A reinforcing structure for strengthening and providing internal circulating spaces in the side walls of a generally rectangular storage battery container of plastic acid resisting material which comprises, a metal box structure embedded in and confined to a side wall of the container, a vertical corrugated member substantially coextensive with and enclosed in and attached to both sides of the box structure along the lines of contact, forming a truss-like structure in horizontal cross section, imparting strength and rigidity to the box structure and thus to the side wall, said corrugated member arranged to provide channels adapted for the circulation of fluid and means for circulating said fluid through these channels.

CORNELIUS AMBRUSTER.